(12) United States Patent
Khoshnevisan et al.

(10) Patent No.: US 12,363,649 B2
(45) Date of Patent: *Jul. 15, 2025

(54) POWER HEADROOM REPORTING FOR UPLINK SHARED CHANNEL REPETITION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/335,902

(22) Filed: Jun. 15, 2023

(65) Prior Publication Data

US 2023/0413191 A1    Dec. 21, 2023

Related U.S. Application Data

(63) Continuation of application No. 17/445,398, filed on Aug. 18, 2021, now Pat. No. 11,722,972.

(Continued)

(51) Int. Cl.
*H04W 52/36* (2009.01)
(52) U.S. Cl.
CPC ............................ *H04W 52/365* (2013.01)
(58) Field of Classification Search
CPC .................................................. H04W 52/365
See application file for complete search history.

(56) References Cited

U.S. PATENT DOCUMENTS

| | | | |
|---|---|---|---|
| 11,722,972 B2 * | 8/2023 | Khoshnevisan | H04W 52/42 370/329 |
| 2011/0134774 A1 * | 6/2011 | Pelletier | H04W 76/15 370/242 |

(Continued)

OTHER PUBLICATIONS

"3rd Generation Partnership Project, Technical Specification Group Radio Access Network, NR, Physical Layer Procedures for Control (Release 16)", 3GPP Draft, Draft 38213-G20, 3rd Generation Partnership Project (3GPP), Mobile Competence Centre, 650, Route Des Lucioles, F-06921 Sophia-Antipolis Cedex, France, Jul. 15, 2020 (Jul. 15, 2020), 3GPP TS 38.213 V16.2.0 (Jun. 2020), XP051908761, 176 pages, p. 14, Line 24-p. 16, Line 13, Paragraph 7.1, Paragraph 7.7, Paragraph 7.7.1.

(Continued)

*Primary Examiner* — James P Duffy
(74) *Attorney, Agent, or Firm* — Harrity & Harrity, LLP\Qualcomm

(57) ABSTRACT

Various aspects of the present disclosure generally relate to wireless communication. In some aspects, a user equipment (UE) may determine a power headroom (PHR) value for a component carrier (CC) based at least in part on a physical uplink shared channel (PUSCH) transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition. The UE may transmit information identifying the PHR value for the CC. Numerous other aspects are provided.

20 Claims, 7 Drawing Sheets

Related U.S. Application Data

(60) Provisional application No. 62/706,515, filed on Aug. 21, 2020.

(56) References Cited

U.S. PATENT DOCUMENTS

| | | |
|---|---|---|
| 2019/0037569 A1 | 1/2019 | Lee et al. |
| 2019/0268861 A1* | 8/2019 | Takeda ................. H04W 24/10 |
| 2021/0385036 A1 | 12/2021 | Bae et al. |

OTHER PUBLICATIONS

International Search Report and Written Opinion—PCT/US2021/071233—ISA/EPO—Dec. 14, 2021.
Moderator (Apple Inc): "Email Discussion #1 on PUSCH Enhancements for NR eURLLC (AI 7.2.5.3)", 3GPP Draft, 3GPP TSG-RAN WG1 Meeting #100bis, R1-2003003, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020 May 1, 2020 (May 1, 2020), XP051879558, pp. 1-4, Paragraph 2.
QUALCOMM: "Remaining Issues on PUSCH Enhancements for URLLC", 3GPP Draft, 3GPP TSG RAN WG1 #101e, R1-2004459, 3rd Generation Partnership Project (3GPP), Mobile Competence Centre, 650, Route Des Lucioles, F-06921 Sophia-Antipolis Cedex, France vol. RAN WG1, No. May 25, 2020-Jun. 5, 2020 May 16, 2020 (May 16, 2020), XP051886188, 4 Pages, Paragraph 4.
Samsung: "PHR for CA", 3GPP Draft, 3GPP TSG RAN WG1 Meeting AH 1801, R1-1800472, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018 Jan. 13, 2018 (Jan. 13, 2018), XP051384890, pp. 1-2, Paragraph 2.

* cited by examiner

POWER HEADROOM REPORTING FOR UPLINK SHARED CHANNEL REPETITION

CLAIM OF PRIORITY UNDER 35 U.S.C. § 120

The present application for patent is a continuation of patent application Ser. No. 17/445,398, entitled "POWER HEADROOM REPORTING FOR UPLINK SHARED CHANNEL REPETITION" filed Aug. 18, 2021, that claims priority to U.S. Provisional Patent Application No. 62/706,515, filed on Aug. 21, 2020, entitled "POWER HEADROOM REPORTING FOR UPLINK SHARED CHANNEL REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for power headroom reporting for uplink shared channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a power headroom (PHR) value for a component carrier (CC) based at least in part on a physical uplink shared channel (PUSCH) transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and transmitting information identifying the PHR value for the CC.

In some aspects, a method of wireless communication performed by a base station includes: receiving information identifying a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and receiving the PUSCH transmission.

In some aspects, a UE for wireless communication includes a memory and one or more processors coupled to the memory, the memory and the one or more processors configured to: determine a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and transmit information identifying the PHR value for the CC.

In some aspects, a base station for wireless communication includes a memory and one or more processors coupled to the memory, the memory and the one or more processors configured to: receive information identifying a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and receive the PUSCH transmission.

In some aspects, a non-transitory computer-readable medium storing a set of instructions for wireless communication includes one or more instructions that, when executed by one or more processors of a UE, cause the UE to: determine a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and transmit information identifying the PHR value for the CC.

In some aspects, a non-transitory computer-readable medium storing a set of instructions for wireless communication includes one or more instructions that, when executed by one or more processors of a base station, cause the base station to: receive information identifying a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and receive the PUSCH transmission.

In some aspects, an apparatus for wireless communication includes: means for determining a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and means for transmitting information identifying the PHR value for the CC.

In some aspects, an apparatus for wireless communication includes: means for receiving information identifying a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; and means for receiving the PUSCH transmission.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
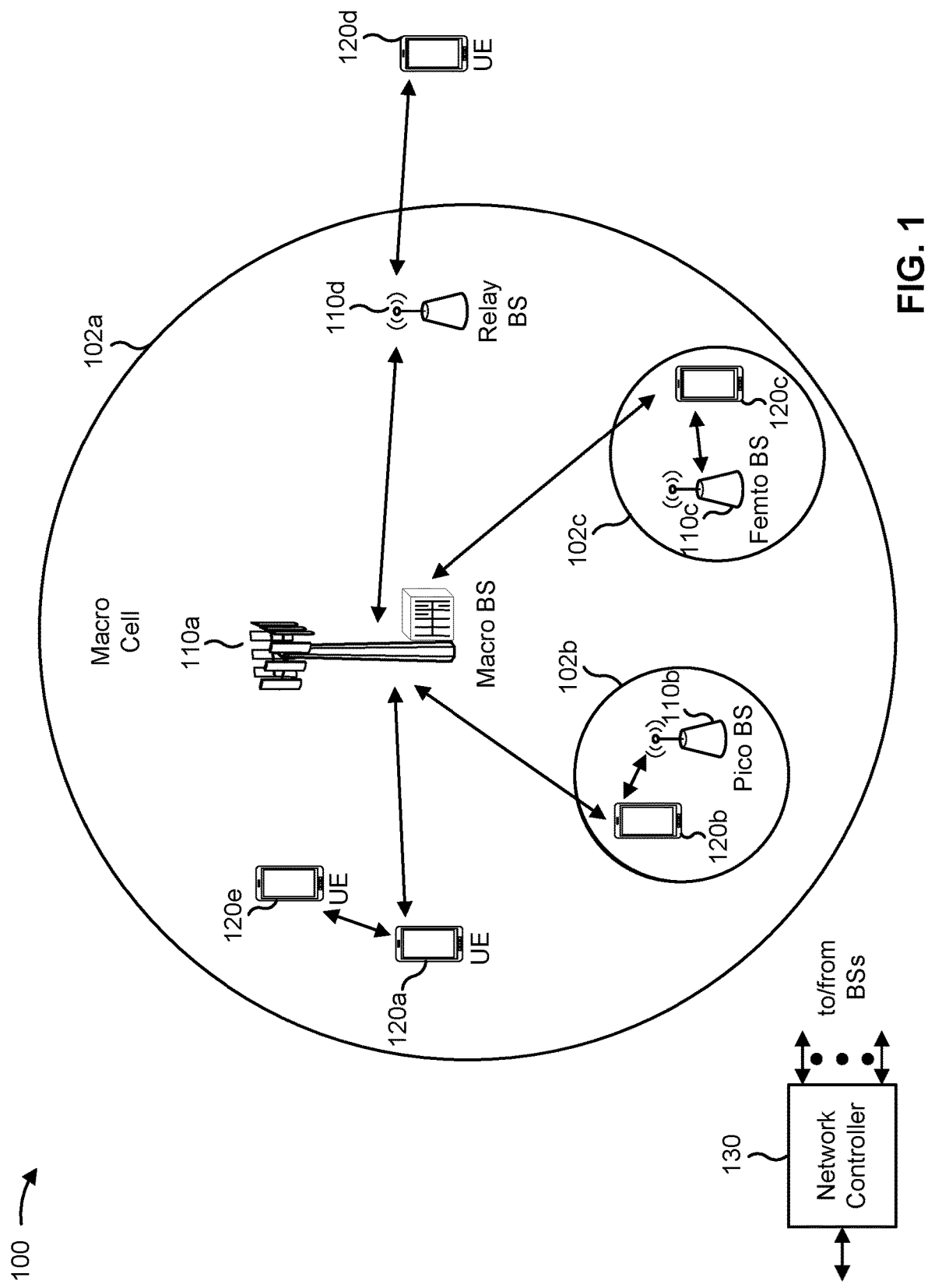
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
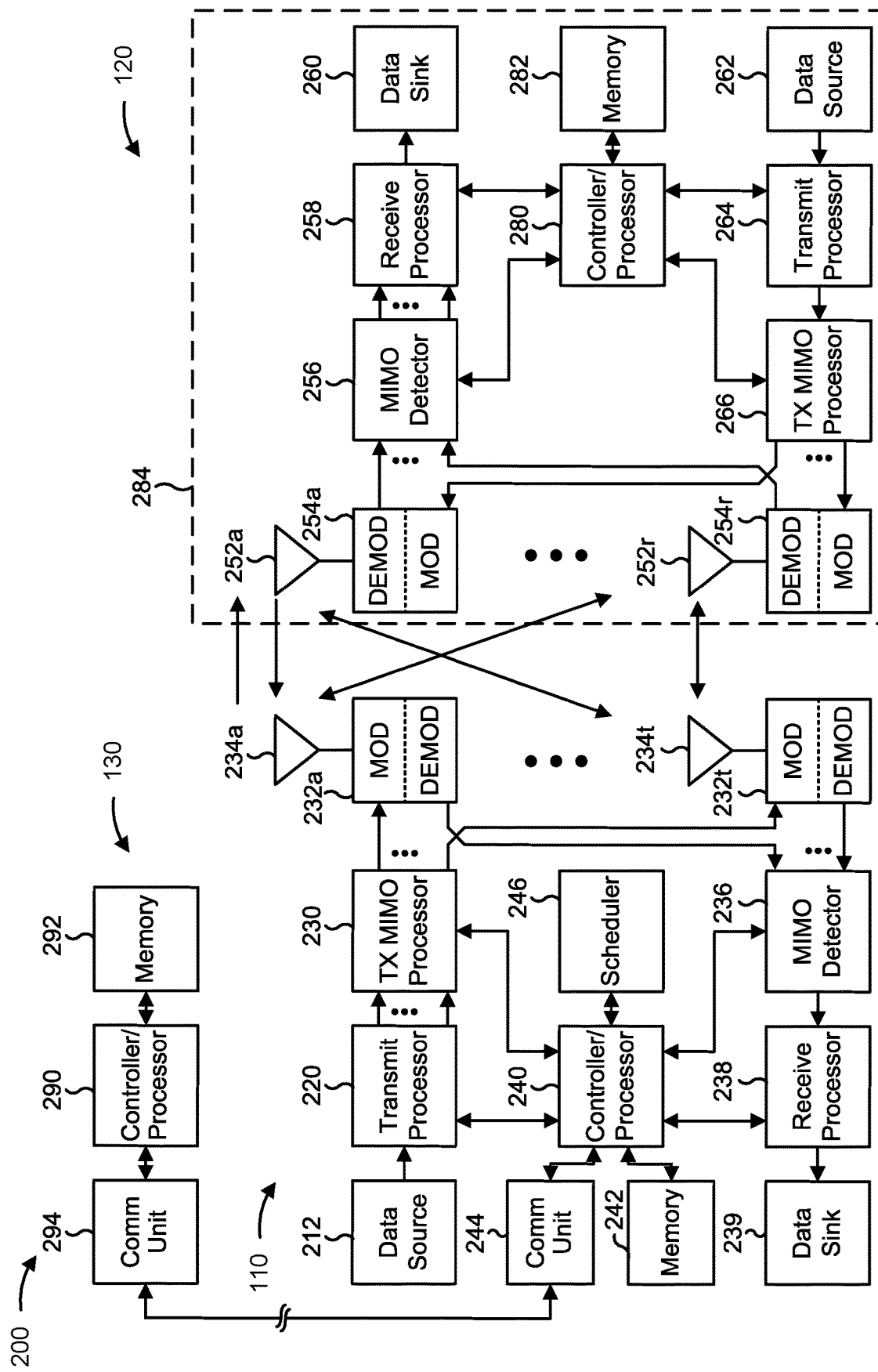
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of base station 110, controller/processor 280 of UE 120, and/or any other component(s) of FIG. 2 may perform one or more techniques associated with power headroom (PHR) reporting for uplink shared channel repetition, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining a PHR value for a CC based at least in part on a physical uplink shared channel (PUSCH) transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; means for transmitting information identifying the PHR value for the CC; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving information identifying a PHR value for a CC based at least in part on a PUSCH transmission in the CC, wherein the PUSCH transmission includes a first repetition associated with a first set of power control parameters and a second repetition associated with a second set of power control parameters, and wherein the PHR value is determined based at least in part on one or more of the first repetition or the second repetition; means for receiving the PUSCH transmission; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Uplink power control may determine a power for PUSCH, physical uplink control channel (PUCCH), sounding reference signal (SRS), and/or physical random access channel (PRACH) transmissions.

A UE may transmit a PUSCH on an active uplink bandwidth part (BWP) b of carrier f of serving cell c using a parameter set configuration with index j and a PUSCH power control adjustment state with index l. The UE may determine a PUSCH transmission power $P_{PUSCH,b,f,c}(i,j,q_d,l)$ in a PUSCH transmission occasion i as:

$$P_{PUSCH,b,f,c}(i, j, q_d, l) = \min \begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{cases}$$

With respect to the PUSCH transmission power $P_{PUSCH,b,f,c}(i,j,q_d,l)$ (in dB), $P_{O\_PUSCH,b,f,c}(j)$ may represent a P0 value for controlling a received power level, $\alpha_{b,f,c}(j)$ may represent an alpha value for partial pathloss (PL) compensation, $PL_{b,f,c}(q_d)$ may represent a pathloss value based at least in part on a measured downlink reference signal with index $q_d$, $\Delta_{TF,b,f,c}(i)$ may depend on a resource allocation and an MCS of the PUSCH, and $f_{b,f,c}(i,l)$ may represent a close loop power control based at least in part on transmit power control (TPC) commands with a closed loop index l (also referred to as a closed loop adjustment state). "RB" is an abbreviation of "resource block."

For a PUSCH transmission, a set of uplink power control parameters may be configured. The uplink power control parameters may include a twoPUSCH-PC-AdjustmentStates parameter, which may be configured when there are two separate loops for closed loop power, and TPC commands may be applied separately for the two separate loops. The uplink power control parameters may include a set of P0 and alpha values for open-loop power control (p0-AlphaSets), where each member in the set may have an ID (p0-PUSCH-AlphaSetId: 0, 1, . . . , 29). The uplink power control parameters may include a list of pathloss reference signals, where each member of the list may have an ID (pusch-PathlossReferenceRS-Id: 0, 1, . . . , 3). The uplink power control parameters may include a list of SRI-PUSCH mappings, where "SRI" refers to an SRS reference indicator or SRS resource indicator, and each member of the list may have an ID (sri-PUSCH-PowerControlId: 0, . . . , 15). In addition, each member of the list may be configured based at least in part on an sri-PUSCH-PowerControlId parameter, which may be used as a codepoint of an SRI field in downlink control information (DCI). When a value of the SRI field in an uplink DCI scheduling PUSCH is x, then uplink power control (ULPC) parameters (e.g., PL RS, P0 and alpha, closed loop index) corresponding to an sri-PUSCH-PowerControlId equal to x may be used for the PUSCH transmission. The SRI field may be up to four bits and may indicate up to 16 values of x, depending on a configuration of the SRI field.

A power headroom may indicate an amount of remaining transmission power available to a UE in addition to power being used by a current transmission. The power headroom may be based at least in part on a difference between a UE maximum transmission power and a PUSCH transmission power. A PHR may be a Type 1 report for a PUSCH, a Type 3 report for an SRS, and/or a Type 2 report for a PUCCH. For example, types of UE PHRs may include a Type 1 UE power headroom that is valid for a PUSCH transmission occasion i on an active UL BWP b of carrier f of serving cell c, or a Type 3 UE power headroom that is valid for an SRS transmission occasion i on an active UL BWP b of carrier f of serving cell c. Thus, a PHR may be determined for a component carrier and/or serving cell.

A UE may determine whether a PHR for an activated serving cell is based at least in part on an actual transmission. The actual transmission may be determined based at least in part on higher layer signalling of configured grant and periodic/semi-persistent sounding reference signal transmissions, and/or DCI received by the UE. The UE may determine whether the PHR for the activated serving cell is based at least in part on a reference format. The reference format may be determined based at least in part on higher layer signalling of configured grant and periodic/semi-persistent sounding reference signal transmissions, and/or DCI received by the UE. The UE may determine whether the PHR for the activated serving cell is based at least in part on a reference format. A PHR for an activated serving cell may be referred to as a virtual PHR and/or may be providing via a virtual PHR report.

When a UE determines that a Type 1 PHR for an activated serving cell is based at least in part on an actual PUSCH transmission, for a PUSCH transmission occasion i on an active uplink BWP b of carrier f of serving cell c, the UE may compute the Type 1 PHR as:

$$PH_{type1,b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

With respect to the Type 1 PHR (in dB) based at least in part on an actual PUSCH transmission, $P_{CMAX,f,c}(i)$ may represent a UE configured maximum output power after backoff due to power management (e.g., backoff due to a maximum power reduction), and $P_{PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ may be parameters used to determine a PUSCH transmit power.

When the UE determines that a Type 1 PHR for an activated serving cell is based at least in part on a reference PUSCH transmission, for a PUSCH transmission occasion i on an active UL BWP b of carrier f of serving cell c, the UE may compute the Type 1 PHR as:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [dB]}$$

With respect to the Type 1 PHR (in dB) based at least in part on a reference PUSCH transmission (e.g., a virtual power headroom report), $\tilde{P}_{CMAX,f,c}(i)$ may be computed assuming no backoff (e.g., maximum power reduction (MPR) values may be assumed to be 0 dB), and $P_{O\_PUSCH,b,f,c}(j)$, $\alpha_{b,f,c}(j)$, $PL_{b,f,c}(q_d)$, and $f_{b,f,c}(i,l)$ may be based at least in part on default or reference parameters of j, i, l, and $q_d$, where for P0 and alpha, p0-PUSCH-AlphaSetId is equal to 0, and for path loss, pusch-PathlossReferenceRS-Id is equal to 0, and for closedloopindex, l is equal to 0.

A PHR may be triggered by a MAC layer, and the PHR may be triggered based at least in part on an occurrence of one or more triggering events. For example, the PHR may be triggered by a set of timers, such as a phr-PeriodicTimer or a phr-ProhibitTimer. The PHR may be triggered by a power change that satisfies a configurable threshold for a pathloss reference signal used for power control in an uplink component carrier. The PHR may be triggered by an activation of a secondary cell (SCell). The PHR may be triggered when an active BWP of a configured component carrier is changed from a dormant state to a non-dormant state.

A triggered PHR may be transmitted in a PHR MAC-CE on a first available PUSCH corresponding to an initial transmission of a transport block that can accommodate the PHR MAC-CE as a result of logical channel prioritization. The PUSCH may be dynamic (e.g., scheduled by DCI), or the PUSCH can be a configured-grant PUSCH.

A UE may be configured with multiple component carriers for a PUSCH transmission. The PHR MAC-CE may include a PHR for more than one component carrier when a multiplePHR parameter is enabled via radio resource control (RRC) signaling. Otherwise, the PHR may be a report for a primary cell (PCell) and a single-entry PHR MAC-CE format may be used. When a first PUSCH in a first component carrier carries the PHR MAC-CE, for a second component carrier, the PHR MAC-CE may include an actual PHR or a virtual PHR (based on a reference format). When a PUSCH transmission is performed on the second component carrier at a time of power headroom reporting (e.g., in a slot of the first PUSCH), and the PUSCH transmission on the second component carrier is scheduled by DCI that satisfies a timeline condition, the PHR MAC-CE may include the actual PHR. Otherwise, the MAC-CE may include the virtual PHR.

The PHR MAC-CE may be a single-entry PHR MAC-CE or a multiple-entry PHR MAC-CE. The single-entry PHR MAC-CE may include a power headroom (PH) field, which may indicate a PH level for the PCell, and a $P_{CMAX,f,c}$ field, which may indicate the $P_{CMAX,f,c}$ used for calculating the preceding PH field. The multiple-entry PHR MAC-CE may include entries for the PCell and a plurality of SCells. For example, for the PCell or a given SCell, the multiple-entry PHR MAC-CE may include the corresponding PH field, the $P_{CMAX,f,c}$ field, a "V" value which may indicate whether a PH value in the PH field corresponds to a real transmission or a reference format, and a "P" value which may indicate whether power backoff is applied due to power management.

Figure 3:
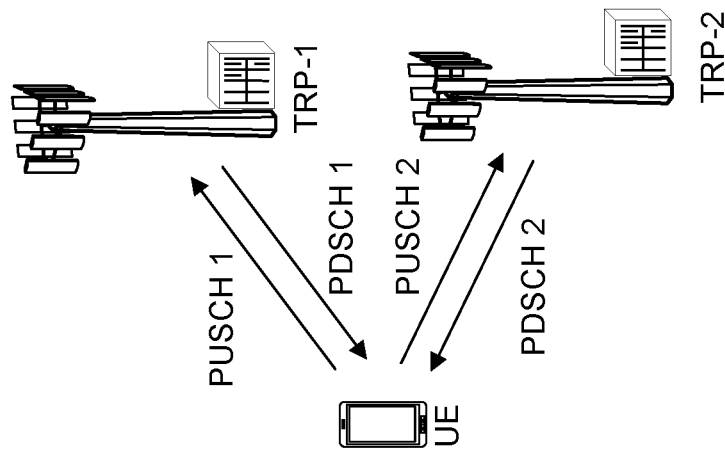
FIG. 3 is a diagram illustrating an example of a multiple transmit receive point (multi-TRP) configuration, in accordance with the present disclosure.

FIG. 3 is a diagram illustrating an example 300 of a multiple transmit receive point (multi-TRP) configuration, in accordance with the present disclosure.

As shown in FIG. 3, a multi-TRP transmission configuration may follow a multi-DCI based design. For example, a UE (e.g., UE 120a) may communicate with a first TRP (TRP-1) and a second TRP (TRP-2). The first TRP may transmit first DCI to the UE via a first physical downlink control channel (PDCCH) (PDCCH 1). The first DCI may schedule a first PUSCH (PUSCH 1) for the UE. The second TRP may transmit second DCI to the UE via a second PDCCH (PDCCH 2). The second DCI may schedule a second PUSCH (PUSCH 2) for the UE. In some aspects, the first TRP and the second TRP may be respective panels (e.g., antenna panels) of a base station. In some aspects, the first TRP and the second TRP may be respective sub-panels of a panel. In some aspects, TRPs may be differentiated by a parameter associated with a control resource set (CORESET) in which a PDCCH associated with a TRP is conveyed. For example, the CORESET may be configured with a CORESET pool index (CORESETPoolIndex), which may map to one of multiple TRPs. A communication associated with a first CORESET pool index may be associated with a first TRP, and a communication associated with a second CORESET pool index may be associated with a second TRP.

As indicated above, FIG. 3 is provided as an example. Other examples may differ from what is described with regard to FIG. 3.

Figure 4:
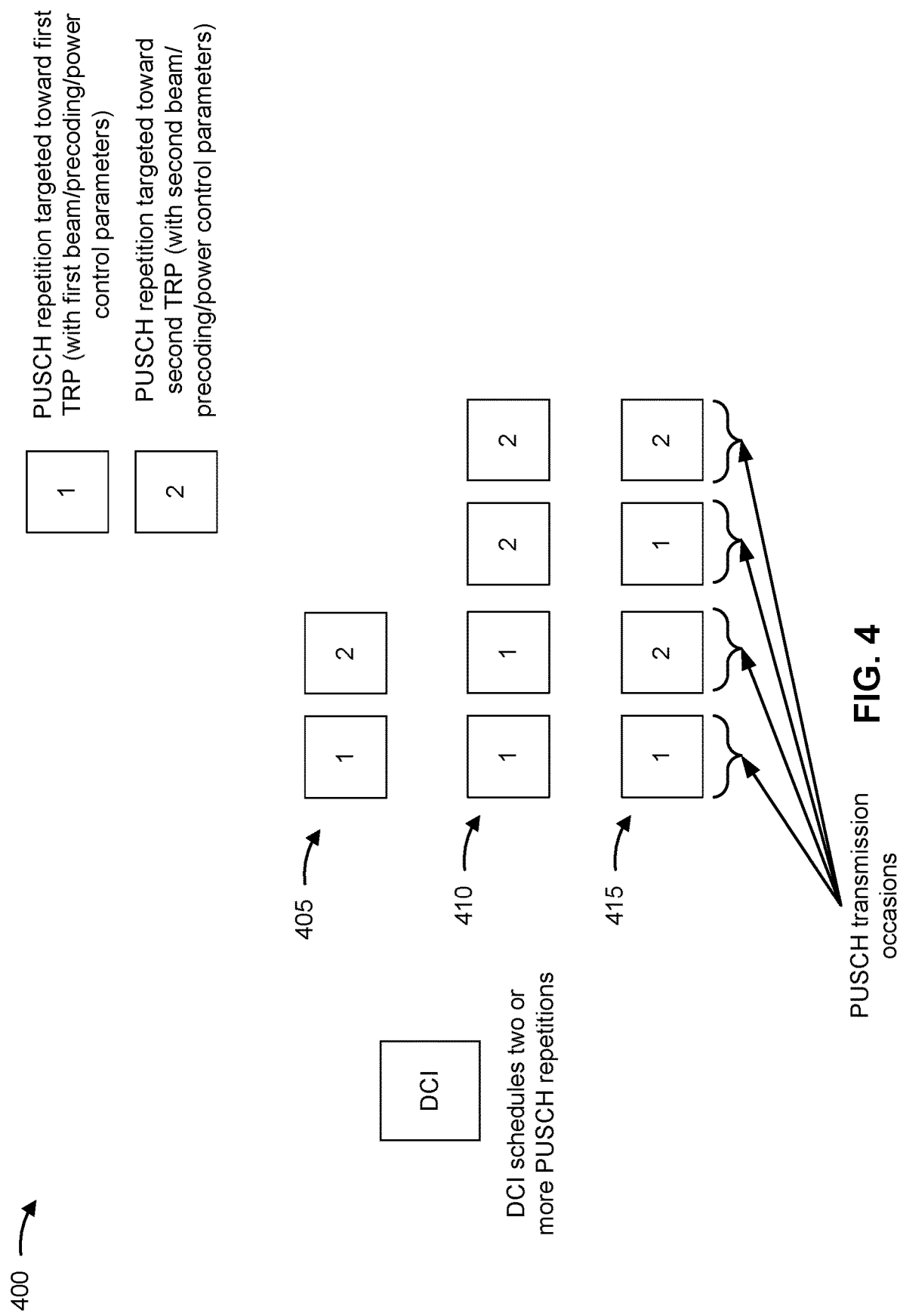
FIG. 4 is a diagram illustrating an example of repetition of a physical uplink shared channel (PUSCH) transmission for a multi-TRP or multi-panel transmission, in accordance with the present disclosure.

FIG. 4 is a diagram illustrating an example 400 of repetition of a PUSCH transmission for a multi-TRP or multi-panel transmission, in accordance with the present disclosure. The repetition of a PUSCH transmission may improve reliability and robustness for the PUSCH for multi-TRP and/or multi-panel operation. In example 400, a box including a 1 represents a PUSCH transmission repetition toward a first TRP or panel (referred to as a first repetition), and a box including a 2 represents a PUSCH transmission repetition toward a second TRP or panel (referred to as a second repetition). For example, the first repetition may be associated with a first set of beam parameters, a first set of precoding parameters, and/or a first set of power control parameters, and the second repetition may be associated with a second set of beam parameters, a second set of precoding parameters, and/or a second set of power control parameters. Thus, if one link is blocked (e.g., corresponding to the first repetition or the second repetition), then another repetition can be decoded by the other TRP or panel, which improves diversity of the PUSCH transmission.

In some aspects, as in example 405, there may be a single first repetition and a single second repetition. In some aspects, as in examples 410 and 415, there may be a set of first repetitions and a set of second repetitions. In some aspects, a set of repetitions (e.g., a set of first repetitions or a set of second repetitions) may be associated with a same set of parameters (e.g., beam parameters, precoding parameters, and/or power control parameters). The set of first repetitions and the set of second repetitions may be transmitted on a same carrier (e.g., a same CC), and may be associated with a same PUSCH corresponding to a same transport block (TB). Furthermore, the set of first repetitions and the set of second repetitions may be scheduled by the same DCI (in the case of a dynamic PUSCH), or may belong to one uplink configured grant occasion of a configured grant configuration (in the case of a configured grant). As shown, each repetition may be transmitted on a respective PUSCH transmission occasion, which may be referred to as a PUSCH occasion.

As mentioned, the first repetition and the second repetition may have different power control parameters. Furthermore, in some cases (such as determining an actual PHR value), the UE may determine a PHR value for a CC on which the first repetition and the second repetition are transmitted based at least in part on the PUSCH transmission. However, there may be ambiguity as to whether the PHR value is determined with regard to the first repetition, the second repetition, or a combination thereof. Since the repetitions may be associated with different power control parameters, this ambiguity may lead to improper or incorrect indication of PHR values, thereby causing increased battery usage, interference, and/or unsuccessful transmissions of the UE. Furthermore, in some aspects, the CC for which the PHR value is determined may be different than a CC on which information identifying the PHR value is transmitted, which can lead to ambiguity in subcarrier spacings and/or the like.

Some techniques and apparatuses described herein enable the determination and reporting of PHR values (e.g., a PHR, $P_{CMAX,f,c}(i)$, and/or the like) based at least in part on a first repetition and/or a second repetition of a PUSCH transmission. For example, some techniques and apparatuses described herein specify which repetition is to be used to determine the PHR value. Some techniques and apparatuses described herein specify a rule for determining which repetition is to be used to determine the PHR value. Some techniques and apparatuses described herein specify for the UE to select a repetition, and signal information indicating the selected repetition, based at least in part on which the PHR value is determined. In this way, ambiguity regarding PHR reporting is reduced or eliminated, thus improving accuracy of PHR reporting. Improving the accuracy and reliability of PHR reporting may reduce battery usage, reduce interference caused by PUSCH transmissions, and improve reliability of UE transmissions.

As indicated above, FIG. 4 is provided as an example. Other examples may differ from what is described with regard to FIG. 4.

Figure 5:
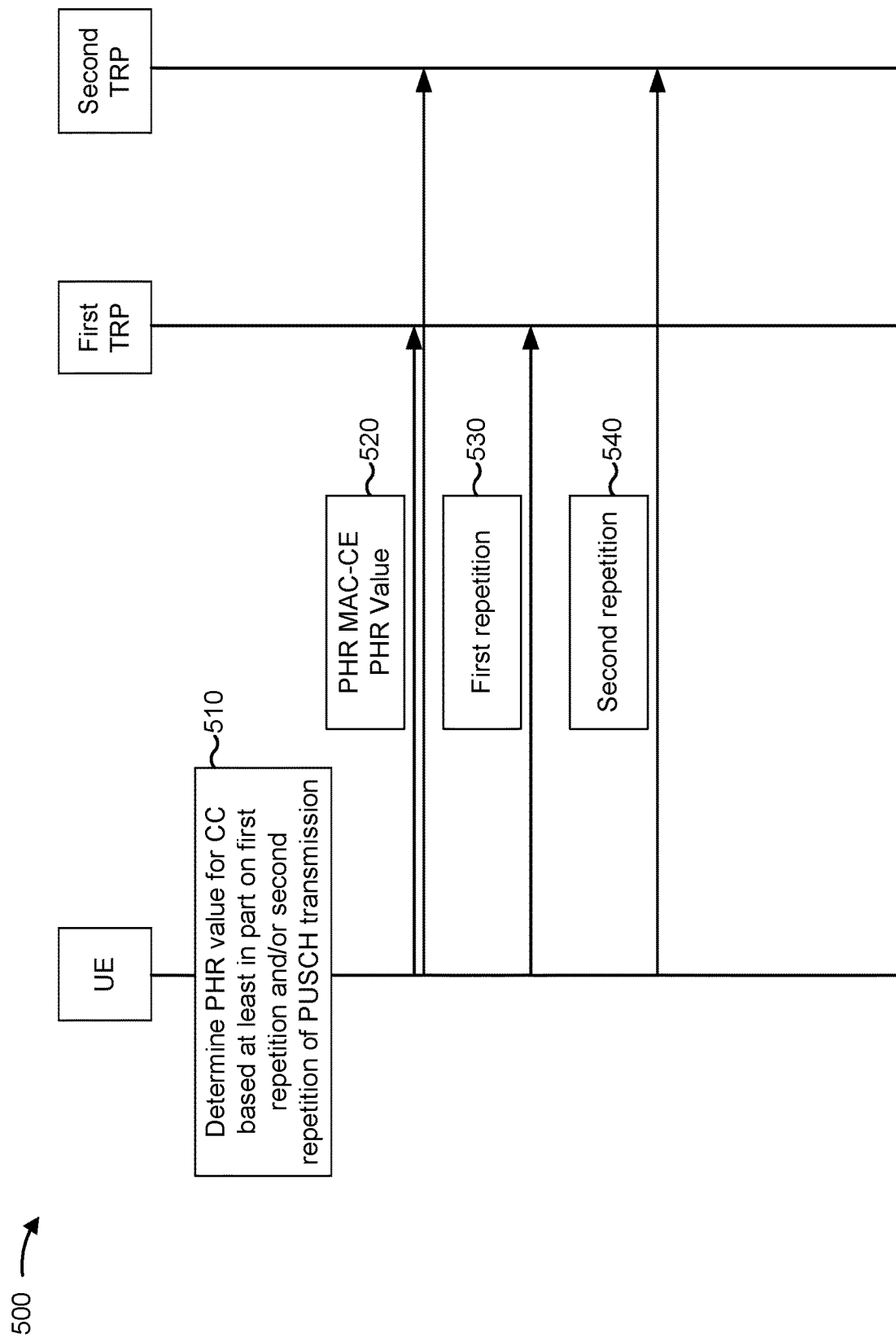
FIG. 5 is a diagram illustrating an example of determining a power headroom (PHR) value based at least in part on a repetition of a PUSCH transmission in a multi-TRP system, in accordance with the present disclosure.

FIG. 5 is a diagram illustrating an example 500 of determining a PHR value based at least in part on a repetition of a PUSCH transmission in a multi-TRP system, in accordance with the present disclosure. While the operations of FIG. 5 (and those described elsewhere herein) are described with regard to a PUSCH transmission in a multi-TRP system, these operations can be implemented for any uplink transmission and for any set of receiving devices (e.g., TRPs, panels, sub-panels, and/or the like). Furthermore, while the operations of FIG. 5 and those described elsewhere herein are described with regard to a first repetition and a second repetition, these operations can be performed for a plurality of repetitions, such as a first set of repetitions and a second set of repetitions, a first, second, and third repetition, and/or the like. As shown, example 500 includes a UE (e.g., UE 120), a first TRP (e.g., BS 110, the TRP of FIG. 3, and/or the like), and a second TRP (e.g., BS 110, the TRP of FIG. 3, and/or the like).

As shown by reference number 510, the UE may determine a PHR value for a CC based at least in part on a first repetition and/or a second repetition of a PUSCH transmission. For example, the first repetition may be associated with a first set of power control parameters and the second repetition may be associated with a second set of power control parameters. The UE may determine the PHR value for the CC based at least in part on the first set of power control parameters, the second set of power control parameters, or a combination thereof. The PHR value may include, for example, one or more PHRs, one or more $P_{CMAX,f,c}$ values, and/or another value associated with PHR reporting. The UE may determine the PHR value based at least in part on the PUSCH transmission. For example, the PHR value may be associated with an actual PHR determined based at least in part on the PUSCH transmission, as compared to a virtual PHR, described elsewhere herein.

In some aspects, the UE may determine whether the PHR value for the CC is to be determined based at least in part on the PUSCH transmission on the CC, or based at least in part on a virtual PUSCH. If the UE determines that the PHR value for the CC is to be determined based at least in part on the PUSCH transmission on the CC, then the UE may determine the PHR value according to the techniques and apparatuses described herein described below with regard to FIG. 5. If the UE determines that the PHR value for the CC is to be determined based at least in part on a virtual CC, then the UE may determine the PHR value based at least in part on a reference format, as described in more detail elsewhere herein.

In some aspects, the UE may determine a PHR value per CC. For example, the UE may determine, for multiple CCs, a respective PHR value for each CC. The UE may report the PHR values in MAC-CEs corresponding to the multiple CCs. In some aspects, the repetitions (e.g., the first repetition and the second repetition) refer to nominal repetitions (e.g., assuming no segmentation for a nominal repetition in case the PUSCH transmission is with repetition Type B).

In some aspects, the UE may determine the PHR value based at least in part on the first repetition. For example, the UE may determine the PHR for the PUSCH transmission based at least in part on the first set of power control parameters associated with the first repetition. "First repetition" may refer to an earliest (in time) repetition of the PUSCH transmission. In some aspects, the UE may determine the PHR value based at least in part on a specific repetition, such as an earliest repetition (here, the first repetition), a latest repetition (here, the second repetition), and/or the like. In some aspects, the UE may perform this determination based at least in part on a configuration, a preconfiguration, and/or the like. Determining the PHR based at least in part on the first repetition conserves signaling resources that would otherwise be used to specify which repetition is to be used and processing resources of the UE that may be used to select which repetition is to be used.

In some aspects, the UE may determine the PHR value based at least in part on an earliest repetition that overlaps an earliest slot in which a PUSCH that carries information identifying the PHR value is transmitted. For example, the UE may determine the PHR value for the PUSCH transmission using a set of power control parameters for a first (e.g., earliest in time) repetition that overlaps with a first slot in which a PUSCH that carries a PHR medium access control control element (MAC-CE) identifying the PHR value. In some aspects, the PUSCH that carries the PHR MAC-CE may be a different PUSCH than the PUSCH transmission for which the PHR value is determined. If the PUSCH for which the PHR value is determined also carries the PHR MAC-CE, then the repetition used to determine the PHR value may be the first repetition. Using the first slot of the PUSCH that carries the PHR MAC-CE may resolve ambiguity regarding which slot is to be used, in the case that the PUSCH that carries the PHR MAC-CE is on a CC with a different subcarrier spacing than a CC for which the PHR value is determined, since such CCs may be associated with different slot lengths.

In some aspects, the UE may be configured with information indicating which repetition is to be used to determine the PHR value. For example, the UE may receive, from a base station (e.g., the first TRP or the second TRP) RRC information indicating whether the PHR value is to be determined based at least in part on a repetition with the first set of power control parameters (e.g., the first repetition) or with the second set of power control parameters (e.g., the second repetition). Configuring the UE to determine the PHR value based at least in part on a particular repetition provides more flexibility than using a given repetition as a matter of course.

In some aspects, the UE may determine whether to determine the PHR value based at least in part on the first set of power control parameters or the second set of power control parameters. For example, the determination may be based at least in part on the UE's implementation. In this case, the UE may provide an indication of whether the PHR value for the PUSCH transmission is determined based at least in part on a repetition with the first set of power control parameters or a repetition with the second set of uplink power control parameters. For example, the indication may include a field in the PHR MAC-CE corresponding to the CC.

In some aspects, the PHR value may be determined based at least in part on the first set of power control parameters and the second set of power control parameters (e.g., corresponding to two different repetitions). For example, the UE may determine a first PHR value and a second PHR value, such as a first $P_{CMAX,f,c}$ and a second $P_{CMAX,f,c'}$ and/or the like. In some aspects, each of the PHR values may be associated with a first PUSCH occasion to a respective TRP. The UE may provide, in the PHR MAC-CE for the CC, information indicating the multiple values. Providing multiple values for the multiple repetitions may improve the performance of PHR reporting. Alternatively, the UE may provide, in the PHR MAC-CE, information indicating one of the multiple values. For example, the UE may select one of the multiple values, and may report the selected value.

As shown by reference number 520, the UE may transmit information identifying the PHR value to the first TRP and/or the second TRP. For example, the UE may transmit a PHR MAC-CE. In some aspects, the PHR MAC-CE may be transmitted on the CC for which the PHR value is determined. In some aspects, the PHR MAC-CE may be transmitted on a different CC than the one for which the PHR value is determined. As shown by reference numbers 530 and 540, the UE may transmit the first repetition to the first TRP and the second repetition to the second TRP. For example, the UE may transmit a first set of repetitions to the first TRP and a second set of repetitions to the second TRP. More generally, the first UE may transmit the first set of repetitions in accordance with a first set of parameters (e.g., beam, precoding, and/or power control parameters) and the second set of repetitions in accordance with a second set of parameters (e.g., beam, precoding, and/or power control parameters).

In this way, ambiguity regarding PHR reporting is reduced or eliminated, thus improving accuracy of PHR reporting. Improving the accuracy and reliability of PHR reporting may reduce battery usage, reduce interference caused by PUSCH transmissions, and improve reliability of UE transmissions.

As indicated above, FIG. 5 is provided as an example. Other examples may differ from what is described with regard to FIG. 5.

Figure 6:
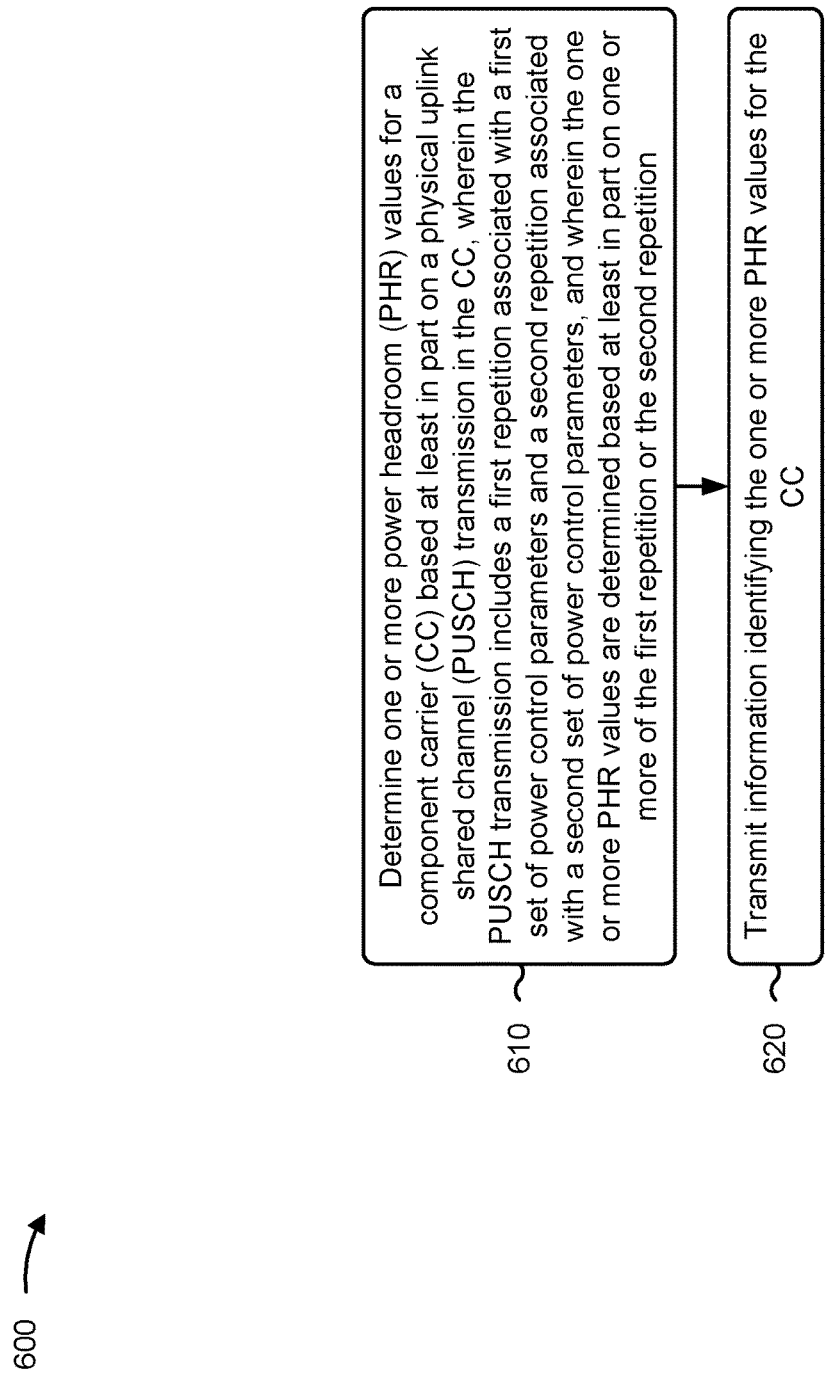
FIGS. 6-7 are diagrams illustrating example processes associated with determining a PHR value based at least in part on a repetition of a PUSCH transmission in a multi-TRP system, in accordance with the present disclosure.

FIG. 6 is a diagram illustrating an example process 600 performed, for example, by a UE, in accordance with the present disclosure. Example process 600 is an example where the UE (e.g., UE 120) performs operations associated with PHR reporting for uplink shared channel repetition.

As shown in FIG. 6, in some aspects, process 600 may include determining one or more PHR values for a CC based at least in part on a PUSCH transmission in the CC, wherein the PUSCH transmission includes a first repetition associated with a first set of power control parameters and a second repetition associated with a second set of power control parameters, and wherein the one or more PHR values is determined based at least in part on one or more of the first repetition or the second repetition (block 610). For example, the UE (e.g., using antenna 252, demodulator 254, MIMO detector 256, receive processor 258, transmit processor 264, TX MIMO processor 266, modulator 254, controller/processor 280, and/or memory 282) may determine one or more PHR values for a CC based at least in part on a PUSCH transmission in the CC. In some aspects, the PUSCH transmission includes a first repetition associated with a first set of power control parameters and a second repetition associated with a second set of power control parameters. In some aspects, the one or more PHR values is determined based at least in part on one or more of the first repetition or the second repetition, as described above.

As further shown in FIG. 6, in some aspects, process 600 may include transmitting information identifying the one or more PHR values for the CC (block 620). For example, the UE (e.g., using antenna 252, transmit processor 264, TX MIMO processor 266, modulator 254, controller/processor 280, and/or memory 282) may transmit information identifying the one or more PHR values for the CC, as described above.

Process 600 may include additional aspects, such as any single aspect or any combination of aspects described below and/or in connection with one or more other processes described elsewhere herein.

In a first aspect, the one or more PHR values is determined using the first set of power control parameters.

In a second aspect, alone or in combination with the first aspect, the one or more PHR values is determined using a set of power control parameters, of the first set of power control parameters and the second set of power control parameters, corresponding to an earliest repetition of the PUSCH transmission that overlaps with a first slot in which the information identifying the one or more PHR values is transmitted.

In a third aspect, alone or in combination with one or more of the first and second aspects, the CC is a first CC associated with a first subcarrier spacing and the information identifying the one or more PHR values for the first CC is transmitted on a second CC associated with a second subcarrier spacing.

In a fourth aspect, alone or in combination with one or more of the first through third aspects, the one or more PHR values is determined based at least in part on a selected repetition of the first repetition or the second repetition, and process 600 further comprises receiving configuration information indicating the selected repetition.

In a fifth aspect, alone or in combination with one or more of the first through fourth aspects, the one or more PHR values is determined based at least in part on a selected set of power control parameters of the first set of power control parameters or the second set of power control parameters, and process 600 further comprises receiving configuration information indicating the selected set of power control parameters.

In a sixth aspect, alone or in combination with one or more of the first through fifth aspects, the one or more PHR values is determined based at least in part on the first repetition and the second repetition.

In a seventh aspect, alone or in combination with one or more of the first through sixth aspects, the one or more PHR values comprises a first PHR for the first repetition and a second PHR for the second repetition.

In an eighth aspect, alone or in combination with one or more of the first through seventh aspects, process 600 includes transmitting information indicating a particular repetition, of the first repetition or the second repetition, based at least in part on which the one or more PHR values is determined.

In a ninth aspect, alone or in combination with one or more of the first through eighth aspects, process 600 includes transmitting information indicating a particular set of power control parameters, of the first set of power control parameters or the second set of power control parameters, based at least in part on which the one or more PHR values is determined.

In a tenth aspect, alone or in combination with one or more of the first through ninth aspects, the information indicating the particular set of power control parameters is transmitted via PHR medium access control information for the CC.

In an eleventh aspect, alone or in combination with one or more of the first through tenth aspects, process 600 includes selecting the particular set of power control parameters.

In a twelfth aspect, alone or in combination with one or more of the first through eleventh aspects, the first repetition and the second repetition are nominal repetitions of the PUSCH transmission.

In a thirteenth aspect, alone or in combination with one or more of the first through twelfth aspects, the one or more PHR values comprises at least one of a PHR, or a maximum output power.

In a fourteenth aspect, alone or in combination with one or more of the first through thirteenth aspects, the first repetition and the second repetition are associated with different beams.

In a fifteenth aspect, alone or in combination with one or more of the first through fourteenth aspects, the first repetition and the second repetition are associated with different precoders.

In a sixteenth aspect, alone or in combination with one or more of the first through fifteenth aspects, the first set of power control parameters is different than the second set of power control parameters.

In a seventeenth aspect, alone or in combination with one or more of the first through sixteenth aspects, the one or more PHR values is a first PHR value and the CC is a first CC, and the process 600 further comprises determining that the first PHR value for the first CC is to be determined based at least in part on the PUSCH in the first CC, wherein the first PHR value is determined based at least in part on one or more of the first repetition or the second repetition based at least in part on determining that the first PHR value for the first CC is to be determined based at least in part on the PUSCH in the first CC; determining that a second PHR value for a second CC is to be determined based at least in part on a virtual PUSCH; and determining the second PHR value based at least in part on a reference format.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
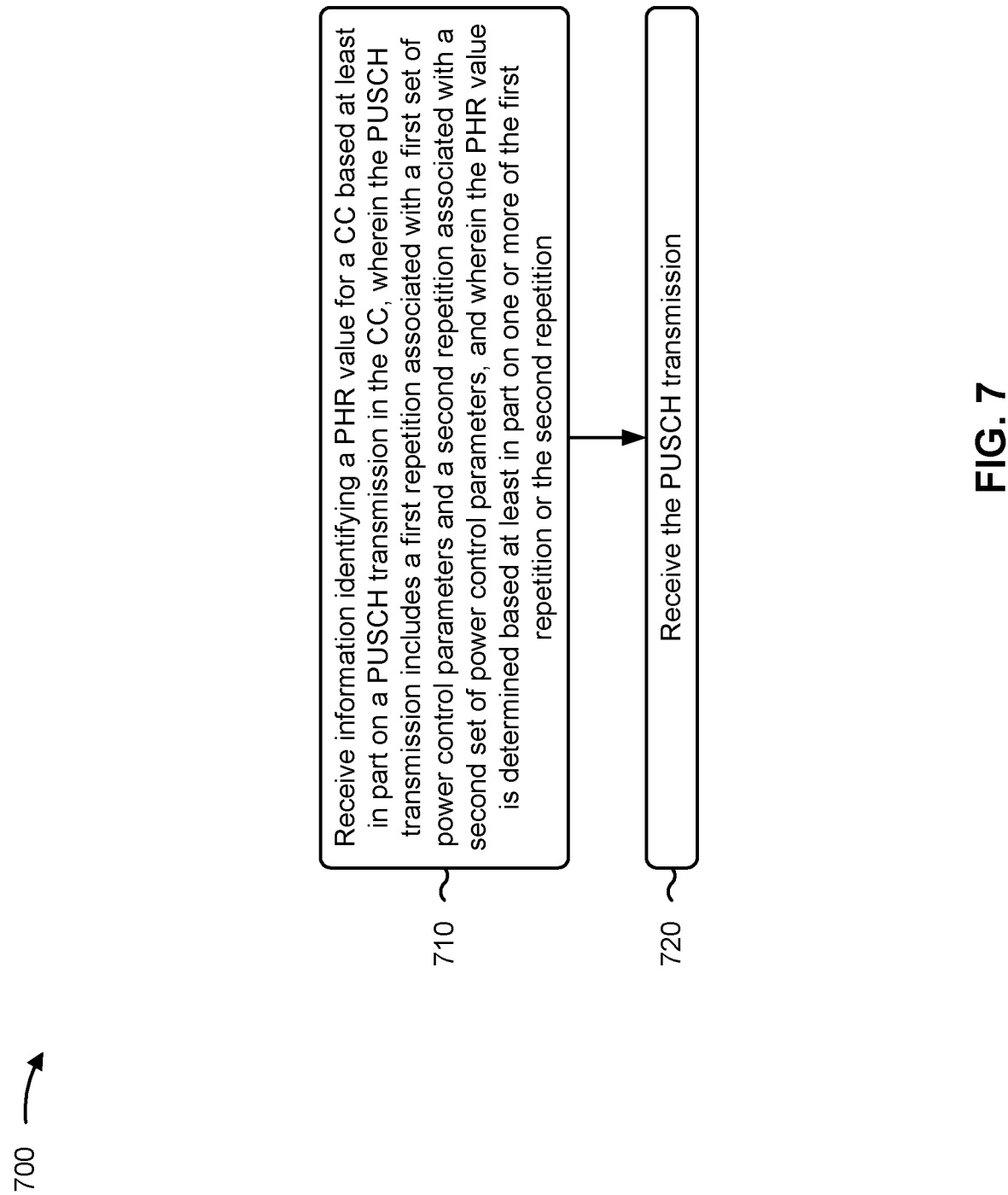

FIG. 7 is a diagram illustrating an example process 700 performed, for example, by a base station, in accordance with the present disclosure. Example process 700 is an example where the base station (e.g., base station 110, a first TRP of FIG. 3, 4 or 5, or a second TRP of FIG. 3, 4, or 5) performs operations associated with PHR reporting for uplink shared channel repetition.

As shown in FIG. 7, in some aspects, process 700 may include receiving information identifying one or more PHR values for a CC based at least in part on a PUSCH transmission in the CC, wherein the PUSCH transmission includes a first repetition associated with a first set of power control parameters and a second repetition associated with a second set of power control parameters, and wherein the one or more PHR values is determined based at least in part on one or more of the first repetition or the second repetition (block 710). For example, the base station (e.g., using antenna 234, demodulator 232, MIMO detector 236, receive processor 238, controller/processor 240, and/or memory 242) may receive information identifying one or more PHR values for a CC based at least in part on a PUSCH transmission in the CC. In some aspects, the PUSCH transmission includes a first repetition associated with a first set of power control parameters and a second repetition associated with a second set of power control parameters. In some aspects, the one or more PHR values is determined based at least in part on one or more of the first repetition or the second repetition, as described above.

As further shown in FIG. 7, in some aspects, process 700 may include receiving the PUSCH transmission (block 720). For example, the base station (e.g., using antenna 234, demodulator 232, MIMO detector 236, receive processor 238, controller/processor 240, and/or memory 242) may receive the PUSCH transmission, as described above.

Process 700 may include additional aspects, such as any single aspect or any combination of aspects described below and/or in connection with one or more other processes described elsewhere herein.

In a first aspect, the one or more PHR values is based at least in part on the first set of power control parameters.

In a second aspect, alone or in combination with the first aspect, the one or more PHR values is based at least in part on a set of power control parameters, of the first set of power control parameters and the second set of power control parameters, corresponding to an earliest repetition of the PUSCH transmission that overlaps with a first slot in which the information identifying the one or more PHR values is received.

In a third aspect, alone or in combination with one or more of the first and second aspects, the CC is a first CC associated with a first subcarrier spacing and the information identifying the one or more PHR values for the first CC is transmitted on a second CC associated with a second subcarrier spacing.

In a fourth aspect, alone or in combination with one or more of the first through third aspects, the one or more PHR values is based at least in part on a selected repetition of the first repetition or the second repetition, and process 700 further comprises transmitting configuration information indicating the selected repetition.

In a fifth aspect, alone or in combination with one or more of the first through fourth aspects, the one or more PHR values is based at least in part on a selected set of power control parameters of the first set of power control parameters or the second set of power control parameters, and process 700 further comprises receiving configuration information indicating the selected set of power control parameters.

In a sixth aspect, alone or in combination with one or more of the first through fifth aspects, process 700 includes receiving information indicating a selected repetition, of the first repetition or the second repetition, based at least in part on which the one or more PHR values is determined.

In a seventh aspect, alone or in combination with one or more of the first through sixth aspects, the information indicating the selected repetition is received via PHR medium access control information for the CC.

In an eighth aspect, alone or in combination with one or more of the first through seventh aspects, the one or more PHR values is based at least in part on the first repetition and the second repetition.

In a ninth aspect, alone or in combination with one or more of the first through eighth aspects, the one or more PHR values comprises a first PHR for the first repetition and a second PHR for the second repetition.

In a tenth aspect, alone or in combination with one or more of the first through ninth aspects, the first repetition and the second repetition are nominal repetitions of the PUSCH transmission.

In an eleventh aspect, alone or in combination with one or more of the first through tenth aspects, process 700 includes receiving information indicating a particular set of power control parameters, of the first set of power control parameters or the second set of power control parameters, based at least in part on which the one or more PHR values is determined.

In a twelfth aspect, alone or in combination with one or more of the first through eleventh aspects, the one or more PHR values comprises at least one of a PHR, or a maximum output power.

In a thirteenth aspect, alone or in combination with one or more of the first through twelfth aspects, the first repetition and the second repetition are associated with different beams.

In a fourteenth aspect, alone or in combination with one or more of the first through thirteenth aspects, the first repetition and the second repetition are associated with different precoders.

In a fifteenth aspect, alone or in combination with one or more of the first through fourteenth aspects, the first set of power control parameters is different than the second set of power control parameters.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: determining one or more power headroom (PHR) values for a component carrier (CC) based at least in part on a physical uplink shared channel (PUSCH) transmission in the CC, wherein the PUSCH transmission includes a first repetition associated with a first set of power control parameters and a second repetition associated with a second set of power control parameters, and wherein the one or more PHR values are determined based at least in part on one or more of the first repetition or the second repetition; and transmitting information identifying the one or more PHR values for the CC.

Aspect 2: The method of Aspect 1, wherein the one or more PHR values are determined using the first set of power control parameters.

Aspect 3: The method of any of Aspects 1-2, wherein the one or more PHR values are determined using a set of power control parameters, of the first set of power control parameters and the second set of power control parameters, corresponding to an earliest repetition of the PUSCH transmission that overlaps with a first slot in which the information identifying the one or more PHR values is transmitted.

Aspect 4: The method of any of Aspects 1-3, wherein the CC is a first CC associated with a first subcarrier spacing and the information identifying the one or more PHR values for the first CC is transmitted on a second CC associated with a second subcarrier spacing.

Aspect 5: The method of any of Aspects 1-4, wherein the one or more PHR values are determined based at least in part on a selected repetition of the first repetition or the second repetition, and wherein the method further comprises: receiving configuration information indicating the selected repetition.

Aspect 6: The method of any of Aspects 1-5, wherein the one or more PHR values are determined based at least in part on a selected set of power control parameters of the first set of power control parameters or the second set of power control parameters, and wherein the method further comprises: receiving configuration information indicating the selected set of power control parameters.

Aspect 7: The method of any of Aspects 1-6, wherein the one or more PHR values are determined based at least in part on the first repetition and the second repetition.

Aspect 8: The method of Aspect 7, wherein the one or more PHR values comprises a first PHR value for the first repetition and a second PHR value for the second repetition.

Aspect 9: The method of Aspect 7, wherein the information identifying the one or more PHR values identifies the first PHR value and the second PHR value.

Aspect 10: The method of Aspect 7, wherein the one or more PHR values are selected from a first PHR value for the first repetition and a second PHR value for the second repetition.

Aspect 11: The method of any of Aspects 1-10, further comprising: transmitting information indicating a particular repetition, of the first repetition or the second repetition, based at least in part on which the one or more PHR values are determined.

Aspect 12: The method of any of Aspects 1-11, further comprising: transmitting information indicating a particular set of power control parameters, of the first set of power control parameters or the second set of power control parameters, based at least in part on which the one or more PHR values are determined.

Aspect 13: The method of Aspect 12, wherein the information indicating the particular set of power control parameters is transmitted via PHR medium access control information for the CC.

Aspect 14: The method of Aspect 12, further comprising: selecting the particular set of power control parameters.

Aspect 15: The method of any of Aspects 1-14, wherein the first repetition and the second repetition are nominal repetitions of the PUSCH transmission.

Aspect 16: The method of any of Aspects 1-15, wherein the one or more PHR values comprises at least one of: a PHR, or a maximum output power.

Aspect 17: The method of any of Aspects 1-16, wherein the first repetition and the second repetition are associated with different beams.

Aspect 18: The method of any of Aspects 1-17, wherein the first repetition and the second repetition are associated with different precoders.

Aspect 19: The method of any of Aspects 1-18, wherein the first set of power control parameters is different than the second set of power control parameters.

Aspect 20: The method of any of Aspects 1-19, wherein the one or more PHR values are a first PHR value and the CC is a first CC, and wherein the method further comprises: determining that the first PHR value for the first CC is to be determined based at least in part on the PUSCH in the first CC, wherein the first PHR value is determined based at least in part on one or more of the first repetition or the second repetition based at least in part on determining that the first PHR value for the first CC is to be determined based at least in part on the PUSCH in the first CC; determining that a second PHR value for a second CC is to be determined based at least in part on a virtual PUSCH; and determining the second PHR value based at least in part on a reference format.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      determine one or more power headroom (PHR) values for a component carrier (CC) based at least in part on an earliest repetition, of a physical uplink shared channel (PUSCH) transmission in the CC, that overlaps with a slot in which a PHR report is transmitted; and
      transmit information identifying the one or more PHR values for the CC.

2. The apparatus of claim 1, wherein the one or more PHR values are determined using a set of power control parameters.

3. The apparatus of claim 1, wherein the one or more PHR values are determined using a set of power control parameters corresponding to the earliest repetition of the PUSCH transmission that overlaps with the slot.

4. The apparatus of claim 1, wherein the CC is a first CC associated with a first subcarrier spacing and the information identifying the one or more PHR values for the first CC is transmitted on a second CC associated with a second subcarrier spacing.

5. The apparatus of claim 1, wherein the one or more processors are further configured to:
   receive configuration information indicating the earliest repetition of the PUSCH transmission that overlaps with the slot.

6. The apparatus of claim 1, wherein the one or more PHR values are determined based at least in part on a selected set of power control parameters, and wherein the one or more processors are further configured to:
   receive configuration information indicating the selected set of power control parameters.

7. The apparatus of claim 1, wherein the earliest repetition of the PUSCH transmission that overlaps with the slot is a first repetition;
   wherein the PUSCH transmission includes a second repetition; and
   wherein the one or more PHR values are determined based at least in part on the first repetition and the second repetition.

8. The apparatus of claim 7, wherein the one or more PHR values comprises a first PHR value for the first repetition and a second PHR value for the second repetition.

9. The apparatus of claim 1, wherein the earliest repetition of the PUSCH transmission that overlaps with the slot is a first repetition;
   wherein the PUSCH transmission includes a second repetition; and
   wherein the one or more processors are further configured to:
   transmit information indicating a particular repetition, of the first repetition or the second repetition, based at least in part on which of the one or more PHR values are determined.

10. The apparatus of claim 1, wherein the one or more processors are further configured to:
   transmit information indicating a set of power control parameters based at least in part on which of the one or more PHR values are determined.

11. The apparatus of claim 1, wherein the earliest repetition of the PUSCH transmission that overlaps with the slot is a first repetition associated with a first set of power control parameters; and wherein the PUSCH transmission includes a second repetition associated with a second set of power control parameters.

12. The apparatus of claim 1, wherein the one or more PHR values comprise at least one of:

a PHR, or a maximum output power.

13. The apparatus of claim 1, wherein the earliest repetition of the PUSCH transmission that overlaps with the slot is a first repetition;

wherein the PUSCH transmission includes a second repetition; and wherein the first repetition and the second repetition are associated with different beams.

14. The apparatus of claim 1, wherein the earliest repetition of the PUSCH transmission that overlaps with the slot is a first repetition;

wherein the PUSCH transmission includes a second repetition; and wherein the first repetition and the second repetition are associated with different precoders.

15. The apparatus of claim 1, wherein the earliest repetition of the PUSCH transmission that overlaps with the slot is a first repetition associated with a first set of power control parameters;

wherein the PUSCH transmission includes a second repetition associated with a second set of power control parameters; and wherein the first set of power control parameters is different than the second set of power control parameters.

16. The apparatus of claim 1, wherein the one or more PHR values are a first PHR value and the CC is a first CC, and wherein the one or more processors are configured to:

determine that a second PHR value for a second CC is to be determined based at least in part on a virtual PUSCH; and determine the second PHR value based at least in part on a reference format.

17. The apparatus of claim 1, wherein the PHR report is associated with the PUSCH transmission.

18. A method of wireless communication performed by a user equipment (UE), comprising:

determining one or more power headroom (PHR) values for a component carrier (CC) based at least in part on an earliest repetition, of a physical uplink shared channel (PUSCH) transmission in the CC, that overlaps with a slot in which the PUSCH transmission is transmitted; and transmitting information identifying the one or more PHR values for the CC.

19. The method of claim 18, wherein the one or more PHR values are determined using a set of power control parameters.

20. The method of claim 18, wherein the one or more PHR values are determined using a set of power control parameters corresponding to the earliest repetition of the PUSCH transmission that overlaps with the slot.

* * * * *